United States Patent [19]

Matsubayashi et al.

[11] Patent Number: 4,682,311

[45] Date of Patent: Jul. 21, 1987

[54] PHOTOMAGNETIC DIFFERENTIAL REPRODUCING SYSTEM

[75] Inventors: Nobuhide Matsubayashi; Kiichi Kato, both of Hachioji, Japan

[73] Assignee: Olympus Optical Co., Ltd., Tokyo, Japan

[21] Appl. No.: 823,559

[22] Filed: Jan. 29, 1986

[30] Foreign Application Priority Data

Jan. 31, 1985 [JP] Japan .................................. 60-16912

[51] Int. Cl.$^4$ .............................................. G11B 11/00
[52] U.S. Cl. ...................................... 369/13; 369/110; 369/112; 350/401
[58] Field of Search .......................... 369/13, 110, 112; 350/401; 360/114

[56] References Cited

U.S. PATENT DOCUMENTS 3,704,997 12/1972 Smith ................................... 350/401
4,599,714 7/1986 Endo ..................................... 369/110

FOREIGN PATENT DOCUMENTS 60-196640 6/1986 Japan .

Primary Examiner—Raymond F. Cardillo
Assistant Examiner—Hoa T. Nguyen
Attorney, Agent, or Firm—Armstrong, Nikaido, Marmelstein & Kubovcik

[57] ABSTRACT

A linearly polarized light is projected upon a recording medium of a photomagnetic type; the reflected light is rotated by an appropriate angle through a halfwave plate and split into a reflected light and a transmitted light through a beam splitter having reflection factors of 0 or 100% for p- or s-polarized light in such a way that the beam splitter functions as an analyzer for one of the reflected and transmitted lights. The other of the reflected and transmitted lights is passed through an analyzer. The two lights passed through the beam splitter and the analyzer are detected by two photodetectors separately and applied to a differential amplifier to generate a reproduction signal of high S/N ratio without the use of a half mirror $R_p = R_s = 50\%$ which is very difficult to manufacture.

3 Claims, 14 Drawing Figures

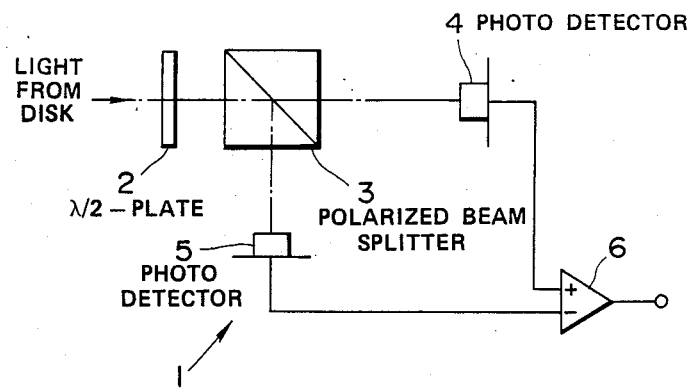
FIG.1 (PRIOR ART)
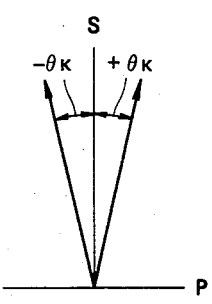
FIG.2
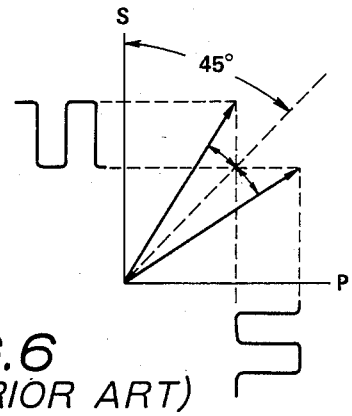
FIG.3
FIG.4a
FIG.4b
FIG.4c
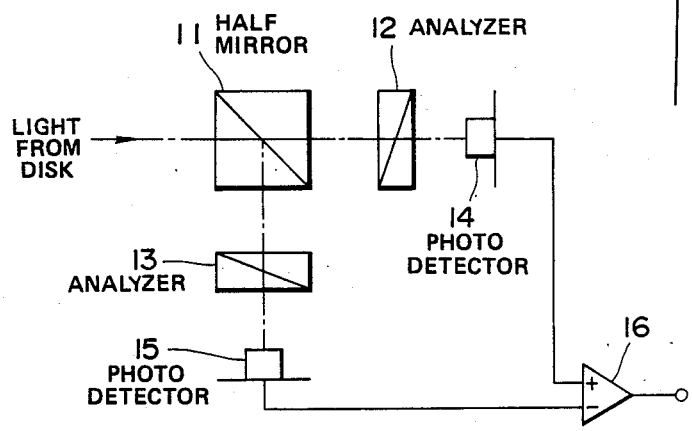
FIG.6 (PRIOR ART)

PHOTOMAGNETIC DIFFERENTIAL REPRODUCING SYSTEM

BACKGROUND OF THE INVENTION

1. Field of the Invention

The present invention relates to a photomagnetic differential reproducing system for recording and reproducing information data to and from a recording medium of a ferromagnetic substance at a high S/N ratio.

2. Description of the Prior Art

Recently, there has been an increasingly strong demand for systems which can record and reproduce a large quantity of information with the advance of the information-related industry. Therefore, photomagnetic recording/reproducing systems are highlighted owing to their capability of recording and reproducing information data in high density.

An example of these photomagnetic recording/reproducing systems is disclosed in Japan Published Unexamined Patent Application No. 58-196640. In this system, however, it is difficult to improve the S/N ratio. This is because in the photomagnetic method a change in the polarizing angle of the reproduced light is extremely small in response to a change in magnetization direction.

To overcome the above-mentioned drawbacks, some photomagnetic reproducing systems of differential type have been proposed. In these prior art systems, however, since a half mirror having a reflection factor of 50% for both p-polarized light and s-polarized light is incorporated therewithin, there still exists problems in that it is extremely difficult to manufacture the half mirror ($R_p = R_s = 50\%$). Additionally, the mirror easily absorbs the produced light and causes a phase difference between reflected and transmitted light, so that the voltage levels of two signals obtained by transducing the reflected and transmitted lights are reduced together with noise included therein, thus raising a problem such that the S/N ratio is not satisfactorily high.

The arrangement and configuration of a prior art photomagnetic differential reproducing system will be described in further detail hereinafter with reference to the attached drawings under the DETAILED DESCRIPTION OF THE PREFERRED EMBODIMENTS.

SUMMARY OF THE INVENTION

With these problems in mind, therefore, it is the primary object of the present invention to provide a photomagnetic differential reproducing system which can improve the S/N ratio markedly.

It is another object of the present invention to provide a photomagnetic differential reproducing system in which the S/N ratio can be improved by setting the orientation angle of an analyzer at an appropriate angle.

It is still another object of the present invention to provide a photomagnetic differential reproducing system which requires no half mirror having the same reflection factor for both p- and s-polarized light.

To achieve the above-mentioned object, the system according to the present invention comprises light projecting means, halfwave plate means, beam splitter means having a reflection factor of zero or 100% for p- or s-polarized light so as to function as an analyzer for one of the split transmitted and reflected light, analyzer means for analyzing the other of the split transmitted and reflected lights, two photodetector means, and a differential amplifier means.

The light reflected from a recording medium is passed through the halfway plate means to rotate the polarization angle, and split into reflected and transmitted lights through the beam splitter means. One of the two split lights is analyzed by the beam splitter means itself but the other thereof is analyzed by the analyzer means. The two analyzed lights are transduced into two electric signals through two photodetector means and applied to the differential amplifier means. Since the two signals applied to inputs of the differential amplifier means are the same in amplitude but reverse in phase with each other, it is possible to generate a reproduced signal of high S/N ratio without the use of a half mirror of $R_p = R_s = 50\%$, which is extremely difficult to manufacture.

BRIEF DESCRIPTION OF THE DRAWINGS

The features and advantages of the system according to the present invention will be more clearly appreciated from the following description taken in conjunction with the accompanying drawings in which:

FIGS. 1 to 6 relate to the prior art systems;

FIG. 1 is a schematic block diagram showing an essential section of the prior art system;

FIG. 2 is a diagram showing the fact that the polarization direction of s-polarized light reflected from a disc is deflected according to the magnetization direction of the disc;

FIG. 3 is a diagram showing the state where the reflected light wave shown in FIG. 2 is rotated 45 degrees through a halfwave plate;

FIG. 4(a) to (c) show waveforms of transduced electric signals inputted to or outputted from the differential amplifier shown in FIG. 1;

FIG. 4(a) is a signal waveform transmitted through the polarized beam splitter and detected by the photodetector to be inputted to the differential amplifier;

FIG. 4(b) is a signal waveform reflected from the polarized beam splitter and detected by another photodetector to be inputted to the differential amplifier;

FIG. 4(c) is a signal waveform outputted from the differential amplifier;

FIG. 5 is a graphical representation showing characteristic relationship between the orientation angle of the analyzer and the carrier beam, various noise levels, respectively;

FIG. 6 is a schematic block diagram showing an essential sections of another prior art system;

FIG. 7 is a schematic block diagram showing the configuration of the reproducing optical system incorporated in the first embodiment according to the present invention;

FIG. 8 is a diagram showing the fact that the polarization direction of p-polarized light reflected from a disc is deflected according to the magnetization direction of the disc, similarly to FIG. 2;

FIG. 9 is a diagram showing the state where the reflected light wave shown in FIG. 8 is rotated by an angle through a halfwave plate;

FIG. 10 is a diagram for showing the waveform of the light signal component reflected from the beam splitter;

FIG. 11 is a diagram for showing the waveform of the light signal component transmitted through the beam splitter and further passed through the analyzer.

DETAILED DESCRIPTION OF THE PREFERRED EMBODIMENTS

Figure 5:
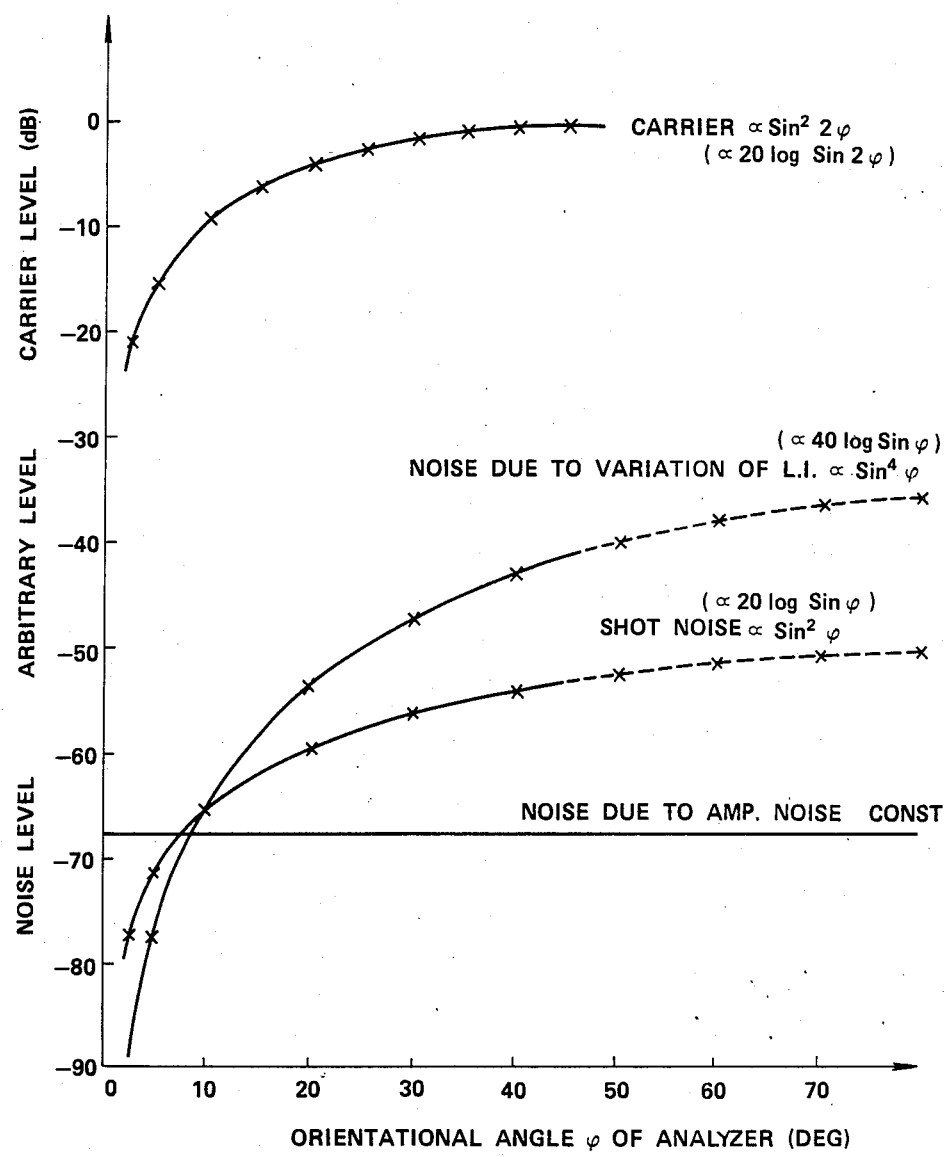

To facilitate understanding of the present invention, a reference will be made to an example of a prior art photomagnetic differential reproducing system with reference to the attached drawings.

FIG. 1 shows a prior art system of the differential type. In the drawing, a linearly polarized light beam is projected in a focused state upon a disc (not shown) of a recording medium formed of a ferromagnetic substance, and the light beam reflected from the disc is passed through a halfwave plate 2 to rotate the polarization direction of the beam by 45 degrees. The beam passed through the plate 2 is transmitted through a polarized beam splitter 3 serving as a polarizer to obtain a p-polarized light and is reflected from the splitter 3 to obtain an s-polarized light. The direction of electric spectrum vibration of the s-polarized light is perpendicular to that of the p-polarized light. The two p- and s-polarized lights are transduced into electric signals corresponding thereto through two photodetectors 4 and 5 separately and applied to two inputs of a differential amplifier 6 independently to obtain a differential amplified signal.

The above system operates as follows: A linearly polarized light incident upon the disc is previously determined to be s-polarized light for the splitter 3. Further, this linearly polarized light reflected from the disc is rotated by an angle + or −, as shown in FIG. 2, according to the magnetization direction of the disc and further rotated by 45 degrees through the halfwave plate 2 as shown in FIG. 3. Therefore, if the light transmitted through the splitter 3 is as depicted in FIG. 4(a), the light reflected from the splitter 3 will be as depicted in FIG. 4(b), because the transmitted light is 180 degrees out of phase with the reflected light or vice versa. On the other hand, since the noise due to light intensity variation included in the transmitted light is in phase with that included in the reflected light, it is possible to cancel the noise while doubling the differential signal.

The above effect upon the reduction of noise due to light intensity variation is at its maximum when the amplitude of the noise detected by the photodetector 4 is the same as that detected by the photodetector 5. In other words, the S/N ratio is the highest when the orientation angle of the halfwave plate 2 is set at 45 degrees.

Further, the intensity I of the modulation light before being applied to a differential amplifier can be expressed as $$I = P_0 \sin 2\theta_K \sin 2\psi$$

where $P_0$ is the light intensity; $\theta_K$ is Kerr rotation angle; $\psi$ is the orientation angle of the analyzer.

When the modulation light is received by the photodetectors 4 and 5 having an amplification degree M, a root-mean square current of the carrier light signal $i_s^2$ can be expressed as $$i_s^2 = (I,K,M)^2 / 2\alpha P_0^2 \sin^2 2\theta_K \sin^2 2\psi \quad (1)$$

where K is the light-to-electricity transducer factor of the photodetector.

The mean intensity of light incident upon the photodetector 4 or 5 is proportional to $P_0 \sin^2\psi$ and the root-mean square current
$i_{np}^2$ of noise due to light intensity variation can be expressed as $$i_{np}^2 = (\alpha K M P_0 \sin^2\psi)^2 = P_0^2 \sin^4\psi \quad (2)$$

where is the variation ratio.

On the other hand, the presence of shot noise is confirmed in addition to noise due to light intensity variation. The root-mean square current thereof $i_{ns}^2$ is expressed as $$i_{ns}^2 = 2eKM^{2+x} BP_0 \sin^2\psi \quad (3)$$

where x is the excess noise factor of the photodetector and B is the bandwidth.

Additionally, there exists amplifier noise $i_{na}^2$ generated by an amplifier itself, which is not related to the orientation angle of the polarizer.

FIG. 5 shows an example of the relationship between the orientation angle of the analyzer and carrier light signal, various noise. FIG. 5 indicates that it is possible to markedly improve the S/N ratio when the noise due to light intensity variation can be reduced.

If noise due to light intensity variation is assumed to be dominant as compared with other kinds of noise, the S/N ratio of the reproduced signal before being applied to a differential amplifier is expressed as $$S/N \propto \sqrt{i_s^2} / \sqrt{i_{np}^2} = P_O \sin2\theta_K \sin2\psi / P_O \sin^2\psi = \sin 2\theta_K \cot\psi \quad (4)$$

Therefore, the smaller the $\psi$, the higher the S/N ratio. However, in practice, if $\psi$ is reduced, since shot noise or amplifier noise becomes dominant, it is impossible to determine optimum value $\psi$ absolutely; that is, the optimum value lies within a range between 0 and 45 degrees. In order to generate a differential signal of high S/N ratio, it is preferable to apply signals of high S/N ratio to a differential amplifier. Accordingly, a system as shown in FIG. 6 has been proposed which can freely set the orientation angle $\psi$ of an analyzer between 0 and 45 degrees.

In FIG. 6, the light reflected from the disc is split into p- and s-polarized light through a half mirror 11 having a reflection factor of $R_p = R_s = 50\%$ for both p- and s-polarized lights. The two split lights are passed through two analyzers 12 and 13, respectively, transduced from light to electricity by two photodetectors 12 and 13, and then applied to two input terminals of a different amplifier 16. In this system, since it is possible to freely set the orientation angle $\psi_1$ and $\psi_2$ of each analyzer to an optimum value between $0 < |\psi_1|$ or $|\psi_2| < 45°$, $\psi_1 = -\psi_2$, it is possible to generate a differential signal of high S/N ratio.

In this connection, in the optical system shown in FIG. 1, a maximum S/N ratio is obtained only at $\psi = 45°$. However, in the optical system shown in FIG. 6, since the orientation angle $\psi$ can be set freely between 0 and 45 degrees, it is possible to readily obain a light signal of higher S/N ratio.

However, since it is very difficult to precisely manufacture a half mirror of $R_p=R_s=50\%$ and additionally light is easily absorbed by the half mirror 11, a phase difference is readily produced between the reflected and transmitted lights. Therefore, the voltage levels of two signals transduced by the photodetectors 14 and 15 are reduced in proportion to the reduction of noise, thus resulting in a problem in that the S/N ratio is not sufficiently improved.

In view of the above description, reference is now made to a first embodiment of the system according to the present invention.

Figure 7:
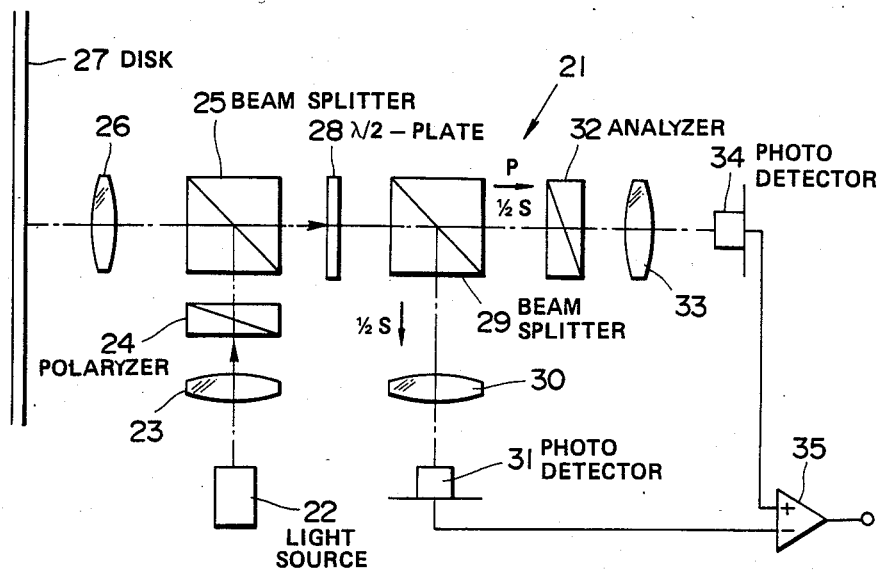
FIGS. 7 to 11 relate to a first embodiment of the system according to the present invention.

In the photomagnetic differential reproducing system 21 shown in FIG. 7, a monochromatic light emitted from a light source 22 such as semiconductor laser diode is converted to a parallel beam through a collimator lens 23, and further to a linearly polarized beam through a polarizer 24. The polarized beam is reflected by a beam splitter 25 and then focused through an object lens 26 so as to be projected as a spot upon a disc 27 of a recording medium, the recording layer of which is formed of a ferromagnetic substance.

Figures 8, 9, 10:
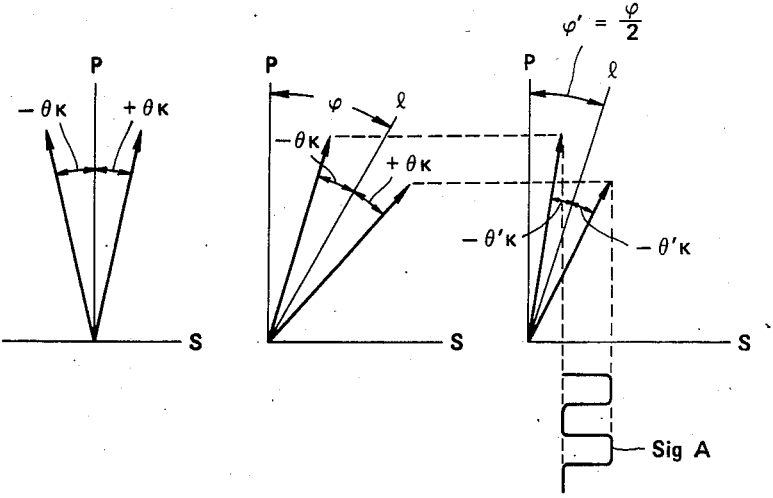

On the other hand, the light reflected from the disc 27 is converted to a parallel beam through the object lens 26, transmitted through the beam splitter 25, and then allowed to be incident upon a halfwave plate 28. When the linearly polarized light projected upon the recording layer of the disc 27 is determined to be p-polarized light in relation to a beam splitter 29 (described latter) with respect to the vibration direction, the reflected polarized light incident upon the halfwave plate 28 is rotated by a small angle $+\theta_K$ or $-\theta_K$ in either direction, as shown in FIG. 8 on the basis of photomagnetic effect in response to the magnetization direction of the recording layer of the disc 27. Therefore, the rotated reflected p-polarized light is further rotated through the halfwave plate 28, as shown in FIG. 9, by an appropriate angle ψ between 0° and 45°, thereafter being allowed to be incident upon the beam splitter 29.

This beam splitter 29 is zero or $R_p=0$ in reflection factor for p-polarized light and 50% or $R_s=50\%$ in reflection factor for s-polarized light. Therefore, the light component reflected from the beam splitter 29 functioning as an analyzer is only the s-polarized light (0.5S), being condensed through a condenser lens 30 and allowed to be incident upon a photodetector 31. In this embodiment, since $R_s=50\%$, the light signal wave received by a photodetector 31 becomes such a signal Sig A as shown in FIG. 10, which corresponds to the case where the rotation angle ψ' is roughly set to ψ/2 as follows: (½) sin ψ=sin ψ/2 cos ψ/2 (=sinψ') sin ψ/2.

On the other hand, the light transmitted through the beam splitter 29 includes p-polarized light component (p) and s-polarized light component (0.5s). This light is passed through an analyzer 32 to transmit only the polarized light component (0.5s) corresponding to the analyzer 32, condensed through a condenser lens 33, and thereafter received by another photodetector 34. In this first embodiment, the polarization direction of the analyzer 32 is roughly set at an angle ψ relative to the direction of the s-polarized light (i.e., roughly at an angle ψ' relative to an axis m perpendicular to the axis l), it is possible to obtain a transmitted signal component Sig B, as shown in FIG. 11, the amplitude of which is the same as that of the reflected wave Sig A (shown in FIG. 10) but 180° out of phase with the wave Sig A.

Figure 11:
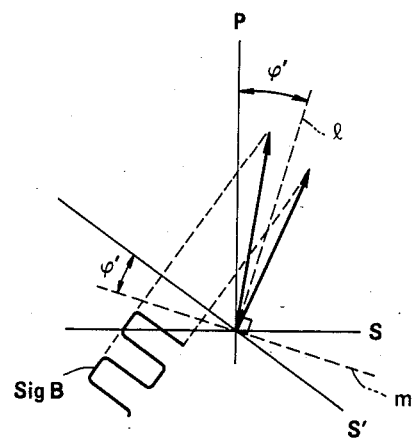

The signal Sig A shown in FIG. 10 vibrates in the direction S away from the straight line 1 at an angle of +(90−ψ'); the signal Sig B shown in FIG. 11 vibrates in the direction s' away from the line 1 at an angle of −(90−ψ'). As a result, both the signals have the same amplitude but 180° out of phase with each other.

The signal outputs received and transduced by the photodetectors 31 and 34 from light to electricity are input to two input terminals of the differential amplifier 35, separately, so that a reproduced signal (Sig B − Sig A) can be obtained from the output terminal of the differential amplifier 35.

In the above first embodiment, since it is possible to obtain the same amplitude and the reverse phase in both the signals Sig A and Sig B even if the orientation angle ψ' of the analyzer is set to an angle other than 45°, it is possible to reduce the noise due to light intensity variation on the basis of the differential output. Additionally, since the loss in signal transmission is small as compared with the half mirror, it is possible to increase the S/N ratio.

Further, since it is possible to use a beam splitter of $R_p=0$ and $R_s=50\%$ ($R_p$: reflection factor of p-polarized light; $R_s$: that of s-polarized light), there is no need of using a half mirror of $R_p=R_s=50\%$, which is extremely difficult to manufacture.

Further, since the orientation angle of the beam splitter 29 or the analyzer 32 can only be determined according to the rotation angle of the halfwave plate 28, it is possible to arbitrarily set the analyzer 32 and the beam splitter 29 functioning as analyzer to any given angle according to the arranged direction of the halfwave plate 28. In other words, the degree of freedom with respect to selection is great, that is, the system is convenient in reducing the size or the dimensions of the system.

Furthermore, there exists an advantage such that the orientation angle of the analyzers can be arranged so as to minimize the sum total of noises under the consideration of the intensity of each noise.

Figure 12:
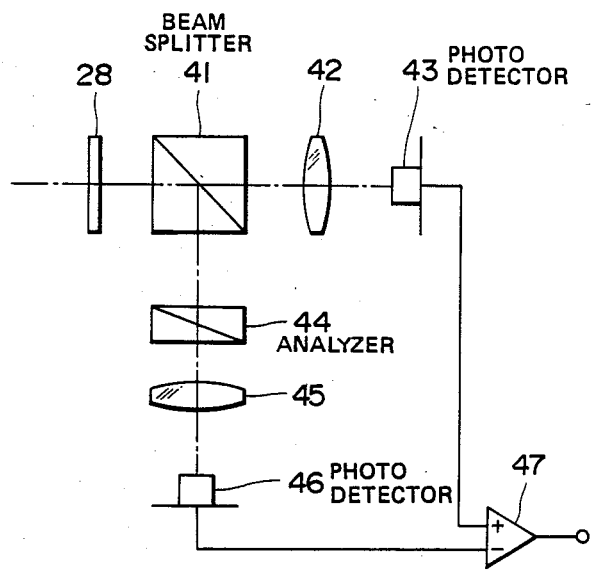
FIG. 12 is a schematic block diagram showing essential sections of a second embodiment according to the present invention.

FIG. 12 shows a second embodiment of the present invention, in which a beam splitter 41 having a reflection factor of 50% for p-polarization light (i.e., $R_p=50\%$) and a reflection factor of 100% for s-polarization light (i.e., $R_s=100\%$) is incorporated. Therefore, only the p-polarization light component (50%) transmitted through a beam splitter 41 which functions as a polarizer is condensed through a condenser lens 42 and then received by a photodetector 43. On the other hand, the p-polarization light component (50%) and the s-polarization light component (100%) reflected from the beam splitter 41 is passed through an analyzer 44, condensed through a condenser lens 43 and then received by a photodetector 46. Two outputs of these two photodetectors 43, 46 are input to a differential amplifier 47 to obtain a differential output.

The beam splitter 29 of $R_p=50\%$ is used in the first embodiment shown in FIG. 7, so that the transmitted light is (p+0.5s) and the reflected light is (0.5s). However, in this second embodiment shown in FIG. 12, since the beam splitter 41 of $R_p=50\%$ and $R_s=100\%$ is used, the transmitted light is (0.5p) and the reflected light is (0.5p+s), the relationship between the transmitted and reflected lights being reversed as compared with the first embodiment. However, the operation of the second embodiment is almost the same as in the first embodiment.

In the above two embodiments, the linearly polarized light projected upon the disc 27 is p-polarized light. However, it is possible to project an s-polarized light upon the disc. In this case, the angle rotated by the halfwave plate is determined within 45 and 90 degrees.

Further, the characteristics of the beam splitter 29 or 41 are not limited to the above-mentioned reflection factors. In the first embodiments the orientation angle of the analyzer 32 is set so that the S/N ratio is at the maximum and the two output signals of two photodetectors 31 and 34 are the same in amplitude (excluding the dc level) but reverse in phase, when the beam splitter 29 of $R_p=0$, $R_s=50\%$ is used, for instance. However, a beam splitter 29 of $R_p=0$, $R_s>50\%$ is usable, because it is possible to realize the same amplitude and the reverse phase of two output signals by determining an appropriate orientation angle of the analyzer 32. For the same reason, it is also possible to use a beam splitter 41 of $R_s=100\%$, $R_p=50\%$ in the second embodiment.

Furthermore, it is evident that the present invention is applicable to other recording mediums such as the card type.

As many apparently widely different embodiments of this invention may be made without departing from the spirit and scope thereof, it is to be understood that the invention is not limited to the specific embodiments described above, but shall be defined as set forth in the appended claims.

What is claimed is:

1. A photomagnetic differential reproducing system, comprising:
   (a) light projecting means for condensing and projecting a linearly polarized beam upon a recording medium having a recording layer formed of a ferromagnetic substance, the projected polarized beam being reflected from the medium with a deflection angle in either direction according to a magnetization direction of the medium;
   (b) halfwave plate means for rotating a polarization direction of the reflected and deflected polarized beam, by an angle;
   (c) beam splitter means for splitting the reflected beam passed through said halfwave plate into a transmitted light and a reflected light while functioning as an analyzer for one of the transmitted light and reflected light, said splitter means being formed with a reflection factor of zero or 100% for s- or p-polarized light, the polarization directions of both the lights being perpendicular to each other;
   (d) analyzer means having a predetermined orientation angle for analyzing the other of the transmitted light and the reflected light;
   (e) two photodetector means for receiving the light reflected from or transmitted through said beam splitter without passing through said analyzer means and the light reflected from or transmitted through said beam splitter passing through said analyzer means and transducing the received lights into two electric signals corresponding thereto, respectively; and
   (f) differential amplifier means responsive to the two transduced electric signals for outputting a differential output signal between the two.

2. The system as set forth in claim 1, wherein said beam splitter has reflection factors of $R_p=0\%$ for the p-polarized light and $R_s=50\%$ for the s-polarized light.

3. The system as set forth in Claim 1, wherein said beam splitter has reflection factors of $R_p=50\%$ for the p-polarized light and $R_s=100\%$ for the s-polarized light.

* * * * *